UNITED STATES PATENT OFFICE.

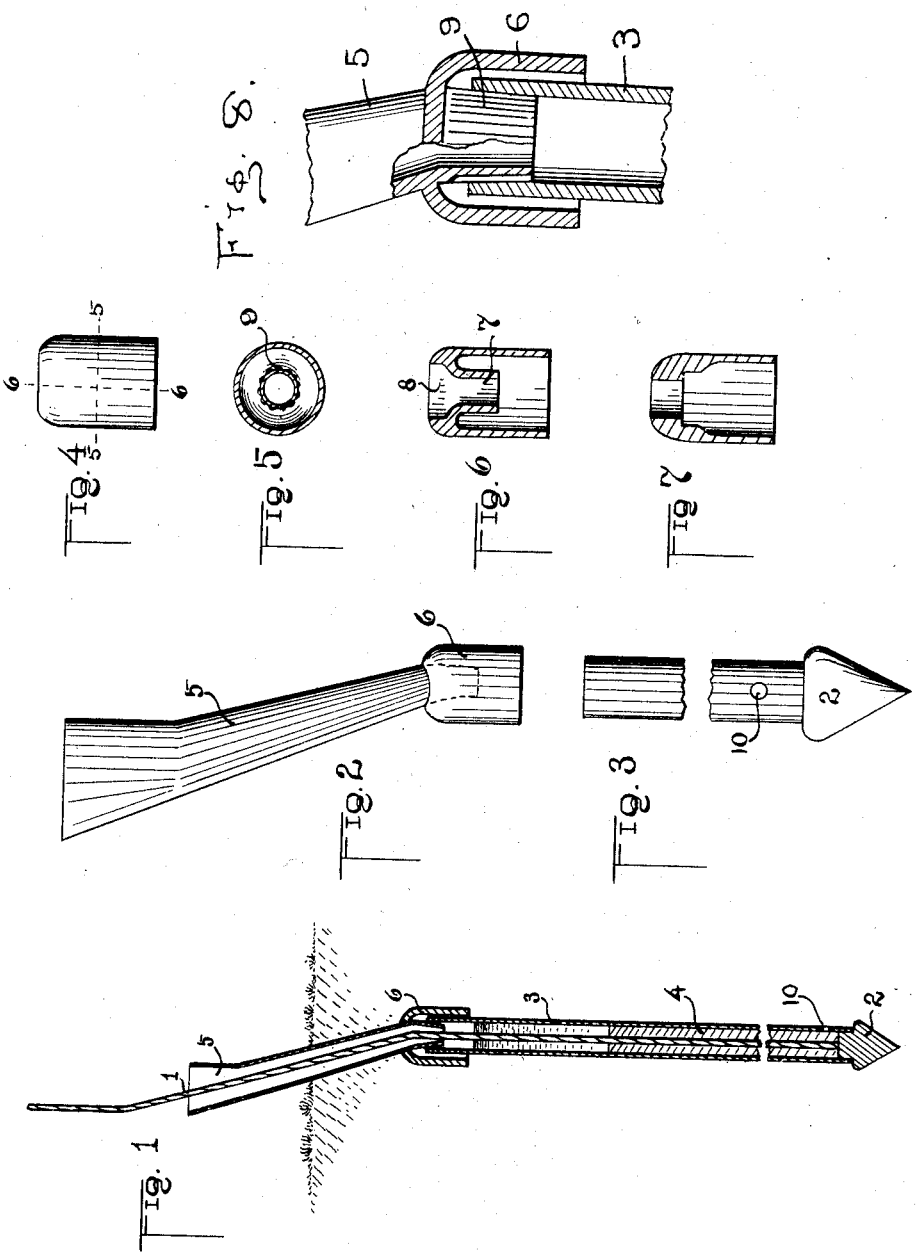

CHARLES E. YARIAN, OF GALION, OHIO.

LIGHTNING-ROD.

984,175.  Specification of Letters Patent.  Patented Feb. 14, 1911.

Application filed March 7, 1910. Serial No. 547,881.

*To all whom it may concern:*

Be it known that I, CHARLES E. YARIAN, a citizen of the United States, residing at Galion, in the county of Crawford and State of Ohio, have invented certain new and useful Improvements in Lightning-Rods; and I do hereby declare the following to be a full, clear, and exact description of the invention, such as will enable others skilled in the art to which it appertains to make and use the same.

My invention relates to new and useful improvements in moistening devices and more particularly to that class adapted to be used for moistening the earth around the ends of lightning rods and my object is to provide a moisture containing chamber around that portion of the rod entered into the ground.

A further object is to provide a filtering medium in said moisture chamber.

A further object is to provide means for directing the overflow from the moisture chamber into the ground.

A further object is to provide a spout for introducing water into said moisture chamber, and, a still further object is to provide a point for the lower end of the moisture chamber, whereby said chamber may be readily introduced into the ground.

Other objects and advantages will be hereinafter referred to and more particularly pointed out in the specification and claims.

In the accompanying drawings which are made a part of this application, Figure 1 is a vertical central sectional view of the device as applied to use. Fig. 2 is a side elevation of the spout for introducing water into the moisture chamber. Fig. 3 is a side elevation partly broken away of the moisture chamber. Fig. 4 is an elevation of the cap surrounding the lower portion of the spout. Fig. 5 is a sectional view thereof as seen on line 5—5 Fig. 4. Fig. 6 is a sectional view as seen on line 6—6 Fig. 4. Fig. 7 is a sectional view of a slightly different form of device. And, Fig. 8 is a detail sectional view of the lower end of the spout and the upper end of the tubular chamber on an enlarged scale.

Referring to the drawings in which similar reference numerals designate corresponding parts throughout the several views, 1 indicates a lightning rod, which may be of the usual or any preferred form, the lower end of which is attached to a point 2, which point is adapted to be entered into the ground a distance below the surface thereof.

Surrounding the upper end of the point 2 and a portion of the rod extending below the earth's surface is a tubular chamber 3, which is adapted to contain water or other suitable moistening medium. The lower portion of the chamber preferably contains powdered charcoal, as shown at 4, or other similar filtering medium, but preferably charcoal in view of its moisture holding qualities. Entering the upper end of the chamber 3 is a spout 5, which also surrounds a portion of the rod 1 and extends a distance above the earth's surface, the upper end of the spout being preferably flared, whereby water or other liquid may be readily introduced into the chamber 3. The lower end of said spout is tapered to fit loosely in the upper end of the chamber, said end being provided on its exterior face with vertical corrugations 9, so as to provide a plurality of spaces between the spout and the inner wall of said chamber, and the meeting point therebetween is placed in the ground below the freezing point so that the water introduced into the chamber will not become frozen and should a sufficient quantity of water be introduced into the spout to rise above the upper end of the chamber 3, the surplus will pass between the lower end of the spout and the upper end of the chamber and thence into the earth's surface through a cap or bowl 6, said cap being of greater diameter than the diameter of the chamber to form a passage through which the water may flow. In Fig. 1 of the drawings, the end of the spout extends through the cap and into the chamber 3, while in Fig. 6, the cap is provided with a downwardly extending neck 7, which enters the chamber 3, while the end of the spout 5 fits in a cavity 8 in the upper end of the cap. The cap 6 may be cast with the spout 5 similar to the structure shown in Fig. 1, if so desired, and, of course, under such conditions, the neck 7 would not be used.

In Fig. 5 of the drawings I have shown a transverse section through the cap, disclosing how the end of the spout 5 extending through the cap is provided on its exterior surface with ribs or corrugations 9, which ribs hold the spout away from the walls of the chamber and insure the passage of the water therefrom.

After the water has entered into the chamber 3, it slowly filters through the charcoal in the lower portion thereof and passes out of the chamber into the surrounding earth through a port 10 at the lower end of the chamber.

The object of my improved device is to keep the earth surrounding the end of the lightning rod in a moistened state, thereby providing a better conductor for the electricity and the soil may be kept moist at all times by occasionally pouring water through the spout into the chamber 3. Should a greater quantity of water be introduced into the spout than is necessary to fill the chamber, it rises in the spout until such time as it can escape between the cap and upper end of the chamber into the earth's surface and as the upper end of the chamber is placed into the earth's surface below the freezing point, the water can be introduced into the chamber in any and all seasons.

What I claim is:—

1. A device of the character described, comprising a chamber, a point introduced in the lower extremity thereof, said chamber having a port therein just above said point, a spout leading to said chamber and having the lower end thereof partially spaced from the lower wall of the chamber, a cap surrounding the lower end of said spout and the upper end of said chamber, said cap being of greater diameter than said chamber, and means within said chamber to retain the moisture therein.

2. A device of the character described, comprising a chamber having a port adjacent the lower end thereof, a point mounted in the lower extremity of said chamber, a spout leading to said chamber, and a cap of larger diameter than said chamber surrounding the upper end thereof, said cap having a cavity therein for the reception of said spout, and a neck extension within said cap adapted to be inserted within said chamber and spaced from the inner wall thereof.

3. A device of the character described, comprising a chamber having a port adjacent the lower end thereof, a point mounted in the lower extremity of said chamber, a cap member of greater diameter than said chamber surrounding the upper end thereof, said cap member being provided with an inner neck extension adapted to be inserted within said chamber and be spaced from the inner wall thereof and also having a cavity in the upper end thereof communicating with said neck extension, a spout leading to and having the lower end inserted within said cavity, and means within said chamber to retain the moisture therein.

4. A device of the character described, comprising a chamber, a point introduced in the lower extremity thereof, said chamber having a port therein just above said point, a spout having the lower end thereof tapered and corrugated, said spout leading to and fitting within the upper end of said chamber, and a cap member surrounding the lower end of said spout and spaced from the upper end of said chamber.

In testimony whereof I have signed my name to this specification in the presence of two subscribing witnesses.

CHARLES E. YARIAN.

Witnesses:
FRANK PIGMAN,
T. S. COTHERS.